US008935544B2

(12) United States Patent
He et al.

(10) Patent No.: US 8,935,544 B2
(45) Date of Patent: Jan. 13, 2015

(54) INDICATOR LIGHT CONTROL CIRCUIT FOR CONTROLLING DIFFERENT INDICATOR LIGHTS VIA GPIO PORT ACCORDING TO DIFFERENT OPERATING OPTIONS SET INTO A BIOS IC

(75) Inventors: Feng-Long He, Shenzhen (CN); Yong-Zhao Huang, Shenzhen (CN)

(73) Assignee: ScienBiziP Consulting (Shenzhen) Co., Ltd., Guangdong (CN)

( * ) Notice: Subject to any disclaimer, the term of this patent is extended or adjusted under 35 U.S.C. 154(b) by 574 days.

(21) Appl. No.: 13/183,669

(22) Filed: Jul. 15, 2011

(65) Prior Publication Data

US 2012/0290853 A1 Nov. 15, 2012

(30) Foreign Application Priority Data

May 11, 2011 (CN) .......................... 2011 1 0121169

(51) Int. Cl.
*G06F 1/26* (2006.01)
*G06F 1/32* (2006.01)
*G06F 11/32* (2006.01)
*H05B 33/08* (2006.01)

(52) U.S. Cl.
CPC .......... *G06F 11/325* (2013.01); *H05B 33/0818* (2013.01); *H05B 33/0845* (2013.01); *Y02B 20/346* (2013.01)
USPC ........................................... 713/300; 713/324

(58) Field of Classification Search
CPC ................ G06F 1/26; G06F 1/00; G06F 1/32
USPC ........................................ 713/300, 324, 340
See application file for complete search history.

(56) References Cited

U.S. PATENT DOCUMENTS

| | | | |
|---|---|---|---|
| 2004/0116163 A1* | 6/2004 | Kim et al. ................... | 455/575.1 |
| 2006/0033456 A1* | 2/2006 | Tsai et al. ..................... | 315/312 |
| 2007/0143058 A1* | 6/2007 | Hsu et al. ...................... | 702/117 |
| 2010/0005211 A1* | 1/2010 | Wen et al. ..................... | 710/302 |
| 2010/0007667 A1* | 1/2010 | Kawata et al. ................ | 345/502 |
| 2010/0250983 A1* | 9/2010 | Wang ............................ | 713/320 |

* cited by examiner

*Primary Examiner* — Mohammed Rehman
*Assistant Examiner* — Phil Nguyen
(74) *Attorney, Agent, or Firm* — Novak Druce Connolly Bove + Quigg LLP

(57) ABSTRACT

An indicator light control circuit includes a basic input output system (BIOS) integrated circuit (IC), a microcontroller, a signal control unit, an electronic switch, and an indicator light. The microcontroller includes a general purpose input output (GPIO) pin. When different operating options of the indicator light are set into and by the BIOS IC, the BIOS IC controls the GPIO pin of the microcontroller to output command signals, such as a low voltage signal, a high voltage signal and pulse signals, then the signal control unit generates and outputs signals according to the command signals. Thus, the electronic switch is operated to turn on or turn off or to pulse when controlling the operation of the indicator light(s).

14 Claims, 2 Drawing Sheets

INDICATOR LIGHT CONTROL CIRCUIT FOR CONTROLLING DIFFERENT INDICATOR LIGHTS VIA GPIO PORT ACCORDING TO DIFFERENT OPERATING OPTIONS SET INTO A BIOS IC

BACKGROUND

1. Technical Field

The disclosure generally relates to control circuits, and more particularly to an indicator light control circuit for more precise control of the operation of indicator lights.

2. Description of the Related Art

Different indicator lights, such as power lights, network link indicators, are widely used on computers, hosts, routers, or other electronic devices to indicate their power state or connection state. When the indicator lights are powered on, it is difficult to distinguish the operation and types of the indicator lights according to their luminance and colors. Moreover, certain parameters of the indicator lights, such as their luminance and flicker frequency, are unchangeable, and cannot be adjusted by users according to their needs.

Therefore, there is room for improvement within the art.

BRIEF DESCRIPTION OF THE DRAWINGS

Many aspects of an indicator light control circuit can be better understood with reference to the following drawings. The components in the drawings are not necessarily drawn to scale, the emphasis instead being placed upon clearly illustrating the principles of the indicator light control circuit. Moreover, in the drawings, like reference numerals designate corresponding parts throughout the several views. Wherever possible, the same reference numbers are used throughout the drawings to refer to the same or like elements of an embodiment.

DETAILED DESCRIPTION

Figure 1:
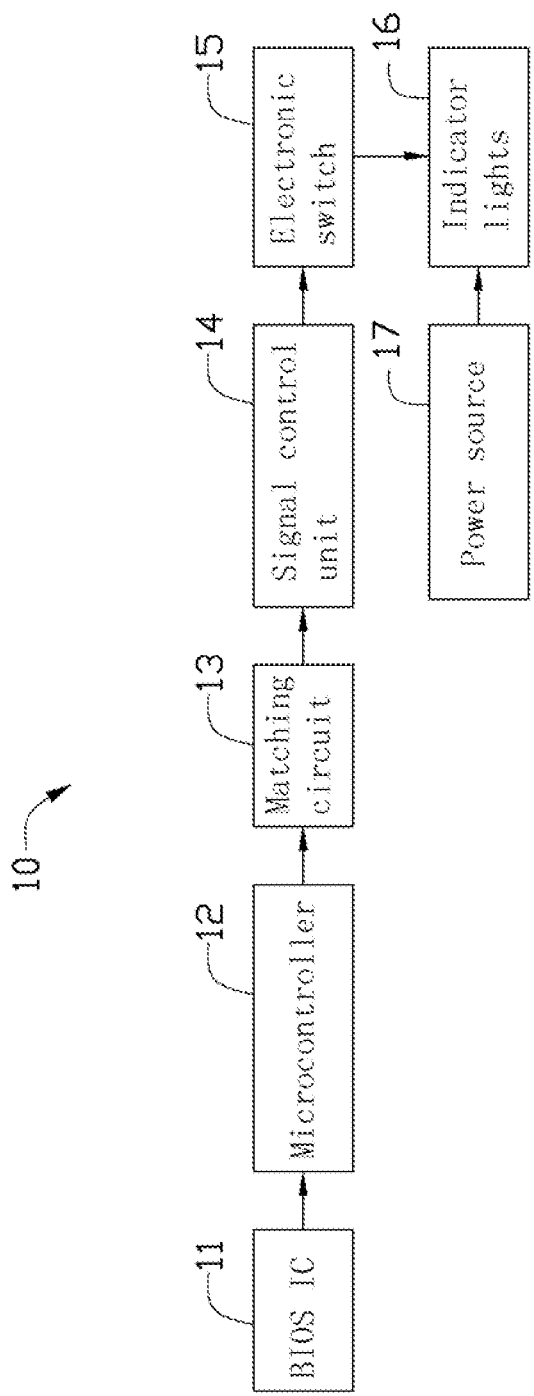
FIG. 1 is a block view of one embodiment of an indicator light circuit of the disclosure.

FIG. 1 shows a block view of one embodiment of an indicator light control circuit 10. The indicator light control circuit 10 can preset and precisely control the operation of different indicator lights, such as power lights and network link indicators. The indicator light control circuit 10 includes a basic input output system (BIOS) integrated circuit (IC) 11, a microcontroller 12, a matching circuit 13, a signal control unit 14, an electronic switch 15, a group of indicator lights 16, and a power source 17. The BIOS IC 11, the microcontroller 12, the matching circuit 13, the signal control unit 14, the electronic switch 15, the indicator lights 16, and the power source 17 are electrically connected in series. In one embodiment, the indicator lights 16 are the power lights of a host computer.

Figure 2:
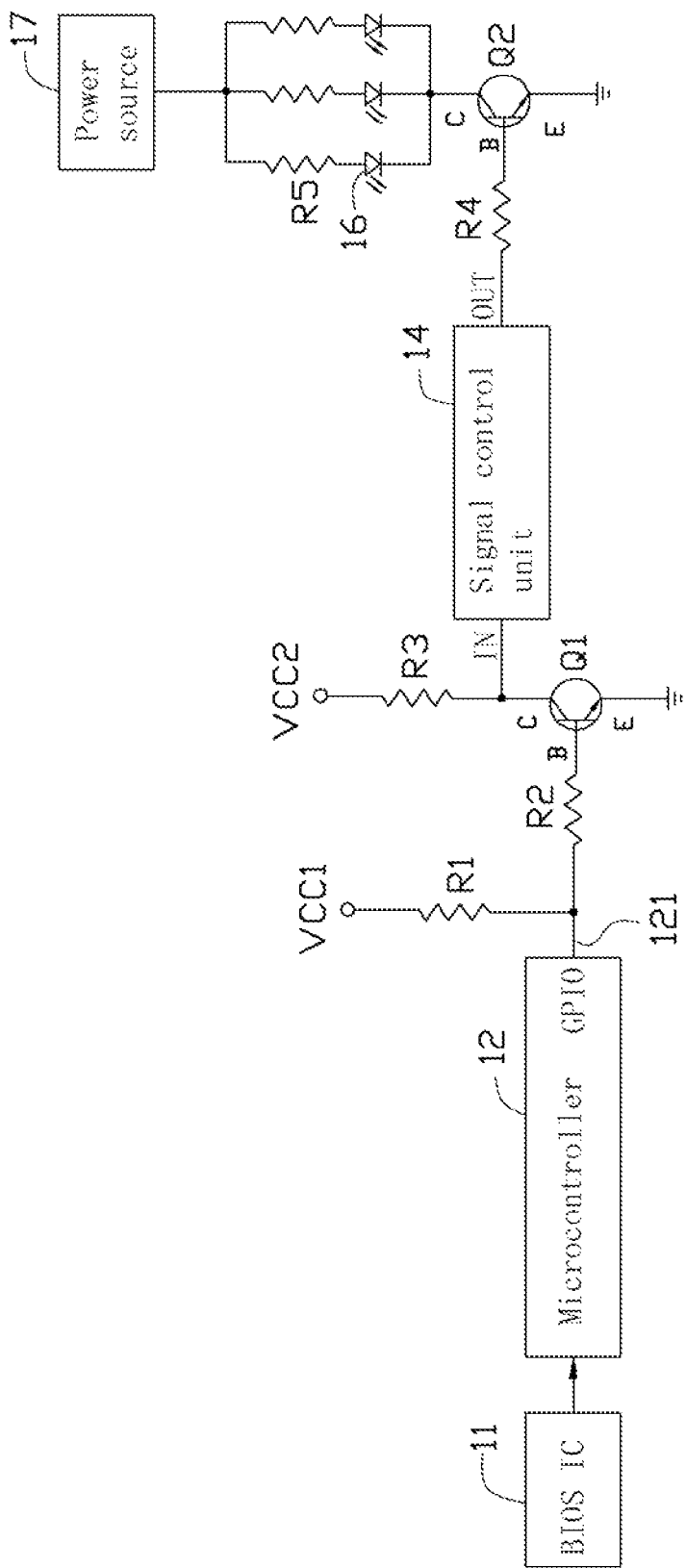
FIG. 2 is a circuit view of the indicator light circuit shown in FIG. 1.

Referring to FIG. 2, in this embodiment, the BIOS IC 11 includes built-in BIOS software whose function is to set up the hardware and load and start an operating system. The BIOS software can be rewritten and upgraded, and is designed to work with the microcontroller 12.

In this embodiment, the microcontroller 12 can be a central processing unit or a Southbridge. The microcontroller 12 includes a general purpose input output (GPIO) pin 121 electrically connected to the BIOS IC 11. In this embodiment, the BIOS IC 11 controls the GPIO pin 121 of the microcontroller 12 to generate and output command signals to precisely control the operation of the indicator light 16. In detail, the operation of the indicator light 16 can be set and reset by changing the BIOS setting on the BIOS interface at booting time. When the BIOS interface is accessed, the BIOS interface can show multiple options, such as light powered-on, light powered-off and light blinking.

For example, when the light powered-on option is selected, the BIOS IC 11 controls the GPIO pin 121 to output a low voltage signal (e.g., logical 0). When the light powered-off option is selected, the BIOS IC 11 controls the GPIO pin 121 to output a high voltage signal (e.g., logical 1). When the light blinking option is selected, the BIOS IC 11 then controls the GPIO pin 121 to output pulse signals including alternating low and high voltage signals. In this embodiment, the pulse width of each pulse signal is T, and the low and high voltage signals each has substantially the same pulse width.

The matching circuit 13 is capable of matching the voltage level between the GPIO pin 121 and the signal control unit 14. In this embodiment, the output and input voltage of the GPIO pin 121 is substantially 3.3V, and the output and input voltage of the signal control unit 14 is substantially 5V. The matching circuit 13 includes a first power supply VCC1, a first pull-up resistor R1, a first transistor Q1, a second power supply VCC2, a first current limiting resistor R2, and a second pull-up resistor R3. In this embodiment, the output voltage of the first power supply VCC1 is 3.3V, the output voltage of the second power supply VCC2 is 5V.

The first power supply VCC1 is electrically connected to the GPIO pin 121 of the microcontroller 12 through the first pull-up resistor R1 to increase the output voltage of the GPIO pin 121. The first transistor Q1 is an npn transistor and includes a base B, a collector C, and an emitter E. The emitter E of the first transistor Q1 is electrically connected to ground, the base B of the first transistor Q1 is electrically connected to the GPIO pin 121 through the first current limiting resistor R2. The collector C is electrically connected to the second power supply VCC2 through the second pull-up resistor R3, while the second pull-up resistor R3 may increase the output voltage of the collector C of the first transistor Q1.

The signal control unit 14 includes an input end IN and an output end OUT, the input end IN is electrically connected to the collector C of the first transistor Q1, and the output end OUT is electrically connected to the electronic switch 15. When the input end IN receives a high, low, or pulse signals, the output end OUT of the signal control unit 14 generates and sends a corresponding switch signal to the electronic switch 15. In this embodiment, the switch signal can be pulse signals and its pulse width is T.

The electronic switch 15 is switched on or off according to the switch signal from the output end OUT of the signal control unit 14, to control the operation of the indicator lights 16. In this embodiment, the electronic switch 15 includes a second current limiting resistor R4 and a second transistor Q2. The second transistor Q2 includes a base B, a collector C, and an emitter E. The base B of the second transistor Q2 is electrically connected to the output end OUT of the signal control unit 14 through the second current-limiting resistor R4. The emitter E of the second transistor Q2 is electrically connected to ground, and the collector C of the second transistor Q2 is electrically connected to the indicator lights 16.

In this embodiment, the second current limiting resistor R4 can be omitted. The second transistor Q2 is an npn transistor, and the electronic switch 15 can be an n-channel Metal-Oxide-Semiconductor Field Effect Transistor (MOSFET), which includes a gate, a drain and a source corresponding to the base B, the collector C and the emitter E of the second transistor Q2.

The indicator lights 16 includes three light emitting diodes (LED). The cathode of each LED is electrically connected to the collector C of the second transistor Q2, and the anode of each LED is electrically connected to the power source 17 through a corresponding third current limiting resistor R5. In this embodiment, the output voltage of the power source 17 is substantially 5V.

Further referring to FIG. 2, in use, when the BIOS IC 11 executes the light powered-on option, the BIOS IC 11 controls the GPIO pin 121 to output a first command signal (e.g., a low voltage signal), therefore, the first transistor Q1 is switched off. Hence, the output OUT of the signal control unit 14 outputs a corresponding switch signal (e.g., a high voltage signal), and the second transistor Q2 is switched on. Thus, the indicator lights 16 are activated and are powered by the power source 17. When the BIOS IC 11 executes the light powered-off option, the BIOS IC 11 controls the GPIO pin 121 to output a second command signal (e.g., a high voltage signal), and the first transistor Q1 is then switched on, so the output OUT of the signal control unit 14 outputs a corresponding switch signal (e.g., a low voltage signal). Thus, the second transistor Q2 is switched off, and power is removed from the indicator lights 16. When the light blinking option is set and selected, the BIOS IC 11 then controls the GPIO pin 121 to output pulse signals, the first transistor Q1 is alternately turned on and off, and the output OUT of the signal control unit 14 outputs corresponding pulse signals. Thus, the second transistor Q2 is alternately switched on and off according to the pulse signals including alternating low and high voltage signals and the indicator lights 16 flash.

In summary, in the indicator light control circuit of this embodiment of the disclosure, the BIOS IC 11 can control the GPIO pin 121 of the microcontroller 12 based on predetermined and preset options to output command signals, such as a low voltage signal, a high voltage signal and pulse signals. Hence, the signal control unit 14 can output switch signals which correspond to the command signals, to more precisely control the operation of the indicator lights 16 and render them more noticeable.

In the present specification and claims the word "a" or "an" preceding an element does not exclude the presence of a plurality of such elements. Further, the word "comprising" does not exclude the presence of other elements or steps than those listed.

Even though numerous characteristics and advantages of the disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An indicator light control circuit, comprising:
a basic input output system (BIOS) integrated circuit (IC);
a microcontroller electrically connected the BIOS IC and comprising a general purpose input output (GPIO) pin;
a matching circuit comprising a first power supply and a first pull-up resistor, the first power supply electrically connected to the GPIO pin of the microcontroller through the first pull-up resistor to increase output voltage of the GPIO pin;
a signal control unit electrically connected to the GPIO pin;
an electronic switch electrically connected to the signal control unit; and
an indicator light electrically connected to the electronic switch, wherein when different operating options of the indicator light are set into and by the BIOS IC, the BIOS IC controls the GPIO pin of the microcontroller to output corresponding command signals, the signal control unit generates and outputs corresponding signals according to the command signals, and the electronic switch is selectively turned on or off to control the operation of the indicators;
wherein the matching circuit is electrically connected between the microcontroller and the signal control unit, the matching circuit is capable of matching a voltage level between the GPIO pin and the signal control unit;
wherein the matching circuit further comprises a first transistor, a second power supply, a first current limiting resistor, and a second pull-up resistor, the first transistor comprises a base, a collector, and an emitter, the emitter of the first transistor is electrically connected to ground, the base of the first transistor is electrically connected to the GPIO pin through the first current limiting resistor, and the collector is electrically connected to the second power supply through the second pull-up resistor, the second pull-up resistor increases the output voltage of the collector of the first transistor.

2. The indicator light control circuit as claimed in claim 1, wherein the output and input voltage of the GPIO pin is 3.3V, the output and input voltage of the signal control unit is 5V, the output voltage of the first power supply is 3.3V, the output voltage of the second power supply is a 5V.

3. The indicator light control circuit as claimed in claim 1, wherein when the BIOS IC controls the GPIO pin to output a first command signal, the first transistor is switched off, the signal control unit outputs a corresponding switch signal, the electronic switch is switched on, and the indicator light is activated and is powered on; when the BIOS IC controls the GPIO pin to output a second command signal, the first transistor is switched on, the signal control unit outputs another corresponding switch signal, the electronic switch is switched off, and the indicator light is powered off.

4. The indicator light control circuit as claimed in claim 3, wherein when the BIOS IC controls the GPIO pin to output pulse signals, the first transistor is alternately turned on and off, the signal control unit outputs corresponding pulse signals, the electronic switch is alternately switched on/off based on the pulse signals, and the indicator light flashes.

5. The indicator light control circuit as claimed in claim 1, wherein the electronic switch comprises a second current limiting resistor and a second transistor, the second transistor comprises a base, a collector, and an emitter, the base of the second transistor is electrically connected to the signal control unit through the second current limiting resistor, the emitter of the second transistor is electrically connected to ground, and the collector of the second transistor is electrically connected to the indicator light.

6. The indicator light control circuit as claimed in claim 5, wherein the first transistor and the second transistor are npn transistors, and the electronic switch is an n-channel MOSFET and comprises a gate, a drain and a source corresponding to the base, the collector and the emitter of the second transistor, respectively.

7. The indicator light control circuit as claimed in claim 5, further comprising a power source, wherein the indicator light is a light emitting diode comprising a cathode and an anode, the cathode indicator light is electrically connected to the collector of the second transistor, and the anode of the indicator light is electrically connected to the power source through a third current limiting resistor, and the output voltage of the power source is substantially 5V.

8. An indicator light control circuit, comprising:
a basic input output system (BIOS) integrated circuit (IC) for starting a BIOS setting;
a microcontroller electrically connected the BIOS IC and comprising a general purpose input output (GPIO) pin, the GPIO pin outputting different voltage signals controlled by the BIOS IC;
a matching circuit comprising a first power supply and a first pull-up resistor, the first power supply electrically connected to the GPIO pin of the microcontroller through the first pull-up resistor to increase output voltage of the GPIO pin;
a signal control unit electrically connected to the GPIO pin and outputting switch signals corresponding to the voltage signals;
an electronic switch electrically connected to the signal control unit and switched on or off under the control of the switch signals of the signal control unit; and
an indicator light electrically connected to the electronic switch, wherein when the GPIO pin outputs a low voltage signal, the electronic switch is switched on, the indicator light is powered on; when the GPIO pin outputs a high voltage signal, the electronic switch is switched off, the indicator light is powered off; when the BIOS IC controls the GPIO pin to output pulse signals, the electronic switch is alternately switched on and off, and the indicator light flashes;
wherein the matching circuit is electrically connected between the microcontroller and the signal control unit, the matching circuit is capable of matching a voltage level between the GPIO pin and the signal control unit;
wherein the matching circuit further comprises a first transistor, a second power supply, a first current limiting resistor, and a second pull-up resistor, the first transistor comprises a base, a collector, and an emitter, the emitter of the first transistor is electrically connected to ground, the base of the first transistor is electrically connected to the GPIO pin through the first current limiting resistor, and the collector is electrically connected to the second power supply through the second pull-up resistor, the second pull-up resistor increases the output voltage of the collector of the first transistor.

9. The indicator light control circuit as claimed in claim 8, wherein the output and input voltage of the GPIO pin is 3.3V, the output and input voltage of the signal control unit is 5V, the output voltage of the first power supply is 3.3V, the output voltage of the second power supply is 5V.

10. The indicator light control circuit as claimed in claim 8, wherein the electronic switch comprises a second current limiting resistor and a second transistor, the second transistor comprises a base, a collector, and an emitter, the base of the second transistor is electrically connected to the signal control unit through the second current limiting resistor, the emitter of the second transistor is electrically connected to ground, and the collector of the second transistor is electrically connected to the indicator light.

11. The indicator light control circuit as claimed in claim 10, wherein when the BIOS IC controls the GPIO pin to output a first command signal, the first transistor is switched off, the signal control unit outputs a corresponding switch signal, the second transistor of the electronic switch is switched on, and the indicator light is activated and is powered on; when the BIOS IC controls the GPIO pin to output a second command signal, the first transistor is switched on, the signal control unit outputs another corresponding switch signal, the second transistor is switched off, and the indicator light is powered off.

12. The indicator light control circuit as claimed in claim 10, wherein when the BIOS IC controls the GPIO pin to output pulse signals, the first transistor is alternately turned on and off, the signal control unit outputs corresponding pulse signals, the second transistor is alternately switched on and off based on the pulse signals, and the indicator light blinks.

13. The indicator light control circuit as claimed in claim 10, wherein the first transistor and the second transistor are npn transistors, and the electronic switch is an n-channel MOSFET and comprises a gate, a drain and a source corresponding to the base, the collector and the emitter of the second transistor, respectively.

14. The indicator light control circuit as claimed in claim 12, further comprising a power source, wherein the indicator light is a light emitting diode comprising a cathode and an anode, the cathode indicator light is electrically connected to the collector of the second transistor, and the anode of the indicator light is electrically connected to the power source through a third current limiting resistor, and the output voltage of the power source is substantially 5V.

* * * * *